(12) United States Patent
Takatani (10) Patent No.: US 10,216,667 B2
(45) Date of Patent: Feb. 26, 2019

(54) IMAGE FORMING APPARATUS, CONTROL METHOD, AND STORAGE MEDIUM

(71) Applicant: CANON KABUSHIKI KAISHA, Tokyo (JP)

(72) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 395 days.

(21) Appl. No.: 15/046,590

(22) Filed: Feb. 18, 2016

(65) Prior Publication Data

US 2016/0246741 A1 Aug. 25, 2016

(30) Foreign Application Priority Data

Feb. 25, 2015 (JP) ................................. 2015-035863

(51) Int. Cl.
*G06F 13/36* (2006.01)
*G06F 13/40* (2006.01)

(52) U.S. Cl.
CPC .......... *G06F 13/36* (2013.01); *G06F 13/4068* (2013.01)

(58) Field of Classification Search
CPC .............................. G06F 13/36; G06F 13/4068
USPC ........................................................ 710/305
See application file for complete search history.

(56) References Cited

U.S. PATENT DOCUMENTS

| 8,806,241 B2 | 8/2014 | Shimizu et al. ............. 713/320 |
| 9,262,513 B2* | 2/2016 | Liu .................... G06F 17/30675 |
| 2007/0180223 A1* | 8/2007 | Tanaka .................. G06F 9/4405 713/2 |
| 2008/0316522 A1* | 12/2008 | Yokoyama ......... H04N 1/32593 358/1.14 |
| 2014/0372742 A1* | 12/2014 | Hayakawa .............. G06F 9/441 713/2 |
| 2016/0062775 A1* | 3/2016 | Yoshihara ............. G06F 9/4418 713/2 |

FOREIGN PATENT DOCUMENTS

| CN | 101945197 A | 1/2011 |
| JP | 2008223866 A | 9/2008 |
| JP | 2009-223866 A | 10/2009 |

OTHER PUBLICATIONS

Chinese Office Action issued in corresponding Chinese Application No. 201610105613.0 dated Jul. 3, 2018.

\* cited by examiner

*Primary Examiner* — Christopher B Shin
(74) *Attorney, Agent, or Firm* — Venable LLP (57) ABSTRACT

An image forming apparatus according to the present embodiment includes a main substrate, a sub substrate that is connected to communicate with the main substrate, and a sub device that is connected to communicate with the sub substrate. The main substrate includes a transfer unit configured to memory-transfer a boot program of the sub substrate and device information necessary in a case where the sub device performs an activation process to a memory of the sub substrate, the sub substrate includes a control unit configured to perform the activation process of the sub substrate based on the boot program and a transmission unit configured to transmit the device information to the sub device, and the sub device includes an execution unit configured to execute the activation process of the sub device using the device information transmitted by the transmission unit.

30 Claims, 6 Drawing Sheets

IMAGE FORMING APPARATUS, CONTROL METHOD, AND STORAGE MEDIUM

BACKGROUND OF THE INVENTION

Field of the Invention

The present invention relates to an image forming apparatus including a main substrate and a sub substrate, a control method of the image forming apparatus and a storage medium storing a program for implementing the control method.

Description of the Related Art

Generally, in response to which a switching operation on a power switch is received, an image forming apparatus is activated from a power OFF state to a job executable state. Further, in response to which a mode switching operation on an operating unit is received, the image forming apparatus is activated from a lower power consumption mode to the job executable state. In the activation of the image forming apparatus, a controller, a printer device, and the like of the image forming apparatus calls a program to a memory and executes a necessary initialization process respectively.

An image forming apparatus disclosed in Japanese Patent Laid-Open No. 2009-223866 includes a controller that includes a main substrate that mainly undertakes general information processing and a sub substrate that mainly undertakes image processing. For the purpose of cost reduction of the controller, computer resources are concentratedly arranged at the main substrate side, and only minimum computer resources are arranged at the sub substrate side.

In the image forming apparatus disclosed in Japanese Patent Laid-Open No. 2009-223866, a boot ROM storing a boot program of the sub substrate is not installed on the sub substrate, and in the activation of the image forming apparatus, the boot program is developed from the memory arranged on the main substrate to the memory of the sub substrate.

SUMMARY OF THE INVENTION

However, in the activation of the image forming apparatus of the related art, the printer device acquires setting information necessary for an operation of the printer device from the main substrate through the sub substrate after a communication path is established between the main substrate and the sub substrate. For this reason, in a case where the printer device performs the activation process based on the setting information, an unnecessary standby time occurs until the communication path is established between the main substrate and the sub substrate, and thus there arises a problem in that the activation of the entire image forming apparatus is delayed.

An image forming apparatus according to the present invention includes a main substrate, a sub substrate that is connected to communicate with the main substrate, and a sub device that is connected to communicate with the sub substrate, in which the main substrate includes a transfer unit configured to memory-transfer a boot program of the sub substrate and device information necessary in a case where the sub device performs an activation process to a memory of the sub substrate, the sub substrate includes a control unit configured to perform the activation process of the sub substrate based on the boot program and a transmission unit configured to transmit the device information to the sub device, and the sub device includes an execution unit configured to execute the activation process of the sub device using the device information transmitted by the transmission unit.

Further features of the present invention will become apparent from the following description of exemplary embodiments (with reference to the attached drawings).

DESCRIPTION OF THE EMBODIMENTS

Hereinafter, an embodiment for carrying out the present invention will be described with reference to the appended drawings. Here, components described in an embodiment are merely examples and not intended to limit to the scope of the present invention. Further, all combinations of components described in an embodiment are not necessarily essential for the solution to the problem.

Embodiment

Figure 1:
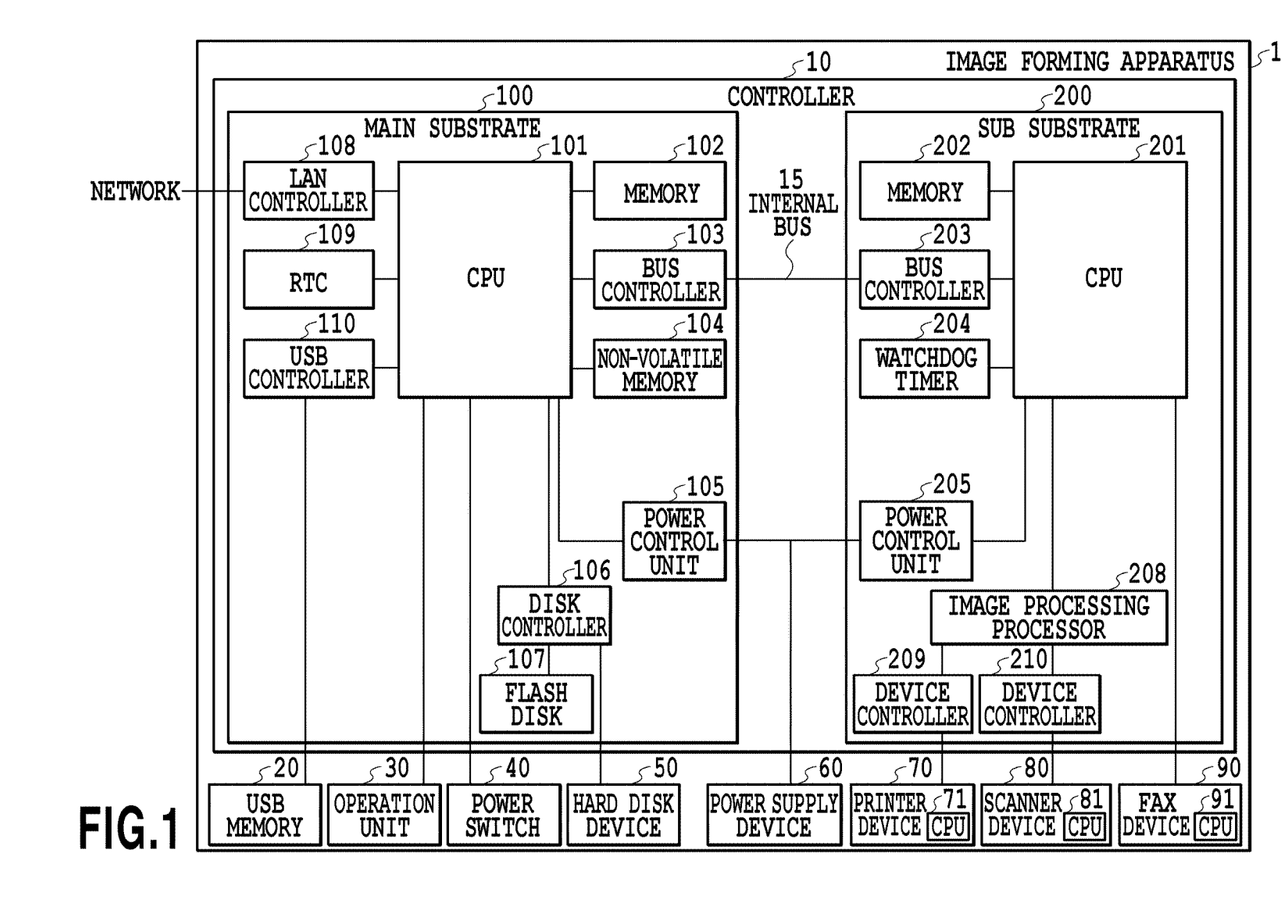
FIG. 1 is a block diagram illustrating a hardware configuration of an image forming apparatus according to an embodiment.

FIG. 1 is a diagram illustrating a hardware configuration of an image forming apparatus 1 according to the present embodiment. A controller 10 will be described in detail with reference to the hardware configuration diagram of FIG. 1. The controller 10 according to the present embodiment includes a main substrate 100 and a sub substrate 200. The main substrate 100 and the sub substrate 200 are connected to be able to communicate with each other.

The main substrate 100 is a so-called generic CPU system. The main substrate 100 includes a CPU 101, a memory (DRAM) 102 serving as a volatile memory, a bus controller 103 having a bridge function with an internal bus 15, a non-volatile memory 104, and a power control unit 105 that manages power supply to the respective units of the main substrate 100. The main substrate 100 further includes a disk controller 106 that controls a flash disk 107 serving as a non-volatile memory device and a hard disk device 50 and a USB controller 110 that can control a USB device such as a USB memory 20. In the present embodiment, particularly, the flash disk 107 and the hard disk device 50 are illustrated as an example of the non-volatile memory device, but a type of a memory is not consequential as long as it is a non-volatile memory device. The main substrate 100 further includes a Real-time Clock (RTC) 109 that holds time information even in a case where the image forming apparatus 1 is in the power OFF state or the lower power consumption mode and a LAN controller 108 that performs communication with an external device via a network. The CPU 101 of the main substrate 100 functions as a control unit that undertakes the activation process of the main substrate 100, a transmission and reception process of various kinds of information with the sub substrate 200, a reset release process on a CPU 201 of the sub substrate 200, and the like. The bus controller 103 functions as a transmission unit that undertakes a transmission and reception process with the sub substrate 200.

An operation unit 30 that can receive an operation of a user is connected to the main substrate 100. The operation unit 30 according to the present embodiment includes various kinds of operation buttons that receive a job input operation on sub devices such as a printer device 70, a scanner device 80, and a FAX device 90. The operation unit 30 according to the present embodiment further includes a power mode switching button that performs switching between a normal power consumption mode in which the image forming apparatus 1 enters the job executable state and a lower power consumption mode in which the image forming apparatus 1 enters a power saving state.

A power switch 40 that can receive a power ON/OFF switching operation of the user is connected to the main substrate 100. In the present embodiment, in a case where the switching operation of the power switch 40 is received, an interrupt to the CPU 101 is generated. Upon detecting the generated interrupt, the CPU 101 controls the power control unit 105 according to the power state of the image forming apparatus 1.

The sub substrate 200 is configured with a generic CPU system and hardware for image processing. The sub substrate 200 includes the CPU 201 that control the whole substrate, a memory (DRAM) 202 serving as a volatile memory, a bus controller 203 having a bridge function with the internal bus 15, and a watchdog timer 204 that monitors an operation of the CPU 201. The sub substrate 200 and the sub device are connected to be able to communicate with each other via device controllers 209 and 210. The CPU 201 of the sub substrate 200 functions as a control unit that undertakes the activation process of the sub substrate 200, and functions as a transmission unit that undertakes the transmission and reception process of various kinds of information with the sub device. The memory 202 functions a storage unit of the sub substrate 200.

The sub substrate 200 includes a power control unit 205 that manages power supply to the respective units of the sub substrate 200 and an image processing processor 208 that performs real-time digital image processing. The sub substrate 200 performs transmission and reception of digital image data through the device controllers 209 and 210 based on instructions of the CPU 201 and the image processing processor 208.

Unlike the main substrate 100, the sub substrate 200 according to the present embodiment does not include a non-volatile memory device that stores a program for executing the activation process of the sub substrate 200. It is because the sub substrate 200 uses resources of the main substrate 100 for the purpose of cost reduction of the controller 10. Further, the sub substrate 200 is configured to be appropriately supplied with data necessary for the operation of the sub substrate 200 from the main substrate 100.

In the image forming apparatus 1 according to the present embodiment, a power supply device 60 is connected to the main substrate 100 and the sub substrate 200 via the power control unit 105 and the power control unit 205, respectively. The main substrate 100 and the sub substrate 200 are supplied with electric power from the power supply device 60. The CPU 201 detects the interrupt generated by the switching operation of the power switch 40 via the bus controllers 103 and 203, and controls the power control unit 205 according to the detected interrupt.

The hardware configuration diagram illustrated in FIG. 1 is a simplified diagram. For example, a plurality of CPU peripheral hardware such as a chip set, a bus bridge, and a clock generator are included in the CPUs 101 and 201, but one in which the CPU peripheral hardware is omitted for describing the present embodiment is illustrated in FIG. 1. Thus, the hardware configuration diagram illustrated in FIG. 1 is not intended to limit the scope of the present invention.

Here, a specific operation of the controller 10 according to the present embodiment will be described in connection with an example in which the printer device 70 copies an image onto a medium such as a sheet. In a case where the operation unit 30 receives an operation to instruct image copy from the user, the CPU 101 of the main substrate 100 transmits an image read command to the scanner device 80 through the CPU 201 of the sub substrate 200. The scanner device 80 optically scans a document, and converts the document into digital image data. The scanner device 80 inputs the converted digital image data to the image processing processor 208 through the device controller 210. The image processing processor 208 transfers the digital image data to the memory 202 through the CPU 201 so that the digital image data is temporarily stored.

In a case where it is checked that a certain amount or the whole amount of the digital image data has been transferred to the memory 202, the CPU 101 outputs an image output instruction to the printer device 70 through the CPU 201. Upon receiving the image output instruction, the CPU 201 transmits an address in the memory 202 at which the digital image data is stored to the image processing processor 208. The digital image data on the memory 202 is transmitted to the printer device 70 through the image processing processor 208 and the device controller 209 according to a synchronous signal supplied from the printer device 70. Then, the printer device 70 executes a printing process for the received digital image data on a medium such as a sheet.

Further, in a case where the printer device 70 prints the same digital image data on a plurality of sheets, the CPU 101 can cause the digital image data of the memory 202 to be stored in the hard disk device 50. In this case, the CPU 101 of the main substrate 100 can transmit an image to the printer device 70 without intervention of the scanner device 80 for second or subsequent printing.

Figure 2:
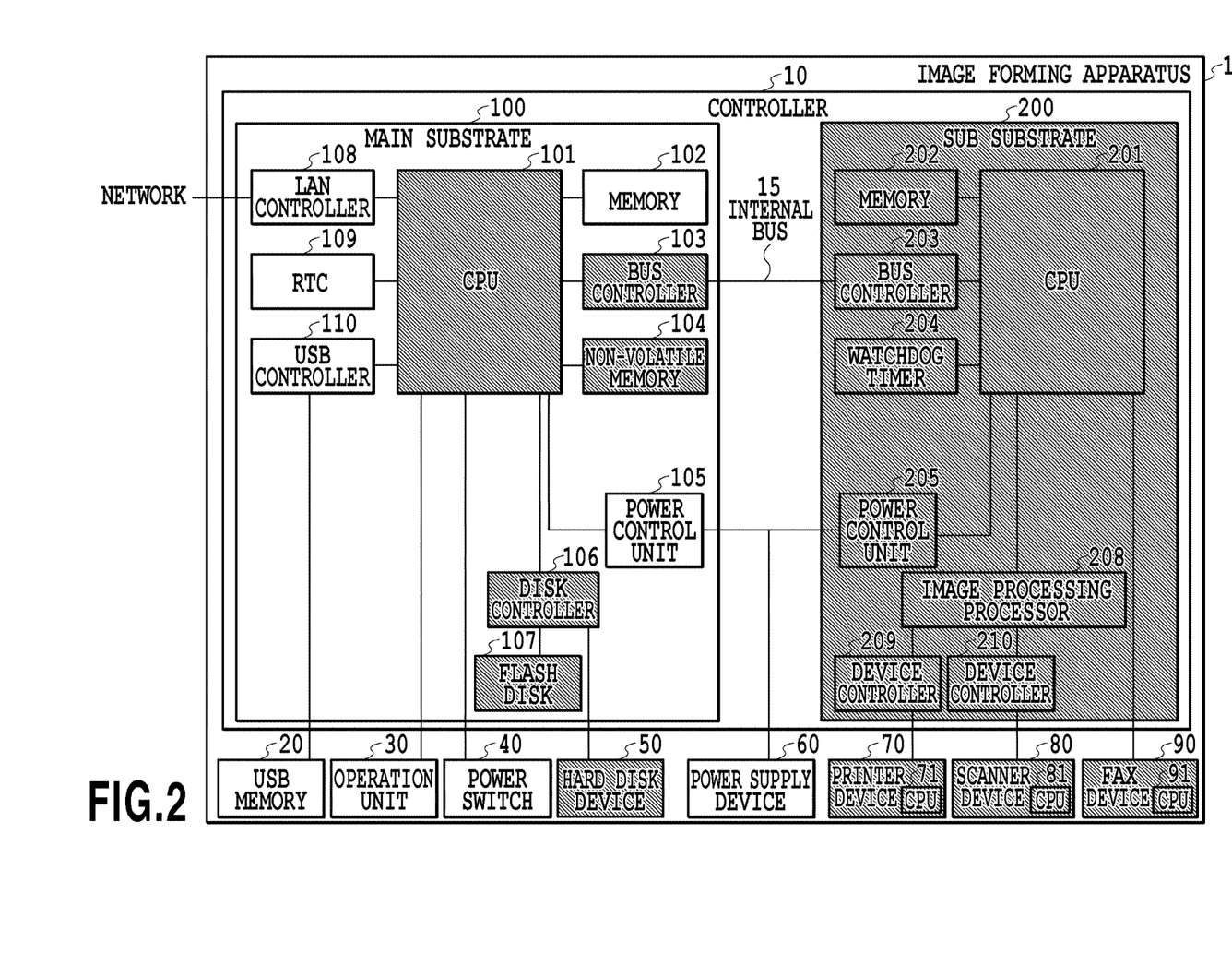
FIG. 2 is a schematic diagram illustrating power supply to an image forming apparatus in a lower power consumption mode according to an embodiment.

FIG. 2 is a schematic diagram illustrating power supply to the image forming apparatus 1 in the lower power consumption mode according to the present embodiment. In the schematic diagram of FIG. 2, a portion to which electric power is supplied through the power supply device 60 is indicated by a white color, and a portion to which power supply is interrupted through the power supply device 60 is indicated by hatching. In a case where the image forming apparatus 1 is in the lower power consumption mode, electric power is supplied from the power supply device 60 to only a portion of the main substrate 100. In other words, electric power is supplied to the LAN controller 108, the RTC 109, the USB controller 110, the power control unit 105, the USB memory 20, the operation unit 30, the power switch 40, and the power supply device 60, and electric power is not supplied to the other portion. In a case where the image forming apparatus 1 is in the lower power consumption mode, power supply from the power supply device 60 to the sub substrate 200 is interrupted.

In the present embodiment, in a case where the image forming apparatus 1 is in the lower power consumption mode, if the switching operation of the power mode on the power mode switching button is received, an interrupt to the CPU 101 is generated. Upon detecting the generated interrupt, in order to activate the image forming apparatus 1 in the normal power mode, the CPU 101 instructs the power control unit 105 and the power control unit 205 to start power supply to the portion to which the electric power has not been supplied in the lower power consumption mode.

Next, the activation process of the image forming apparatus 1 will be described with reference to FIGS. 3 to 6. In the exemplary embodiment, in a case where the image forming apparatus 1 returns from the lower power consumption mode, the CPU 101 transfers a sub substrate program read from the flash disk 107 to the memory 202 of the sub substrate 200.

Figure 3:
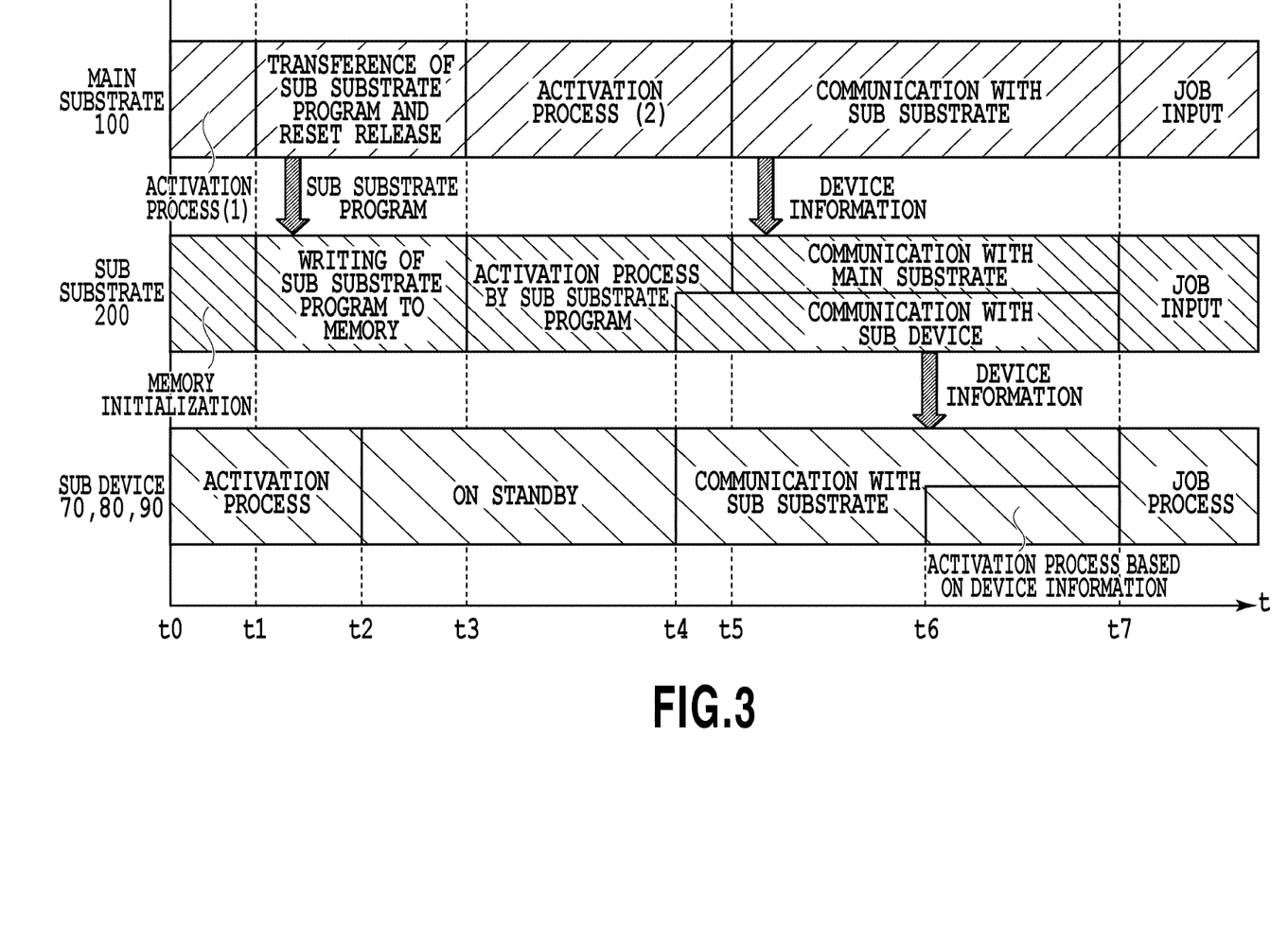
FIG. 3 is a time chart illustrating an activation sequence of an image forming apparatus according to a related art.

FIG. 3 is a time chart illustrating an activation sequence of an image forming apparatus according to a related art. The activation sequence of the image forming apparatus according to the related art will be described with reference to the time chart illustrated in FIG. 3. For the sake of convenience, respective hardware components of the image forming apparatus according to the related art are assumed to be similar to the respective hardware components of FIG. 1 and denoted by the same reference numerals.

At t0, each of the main substrate 100, the sub substrate 200, and the printer device 70 starts the activation process. The main substrate 100 calls a program necessary for the activation of the main substrate 100 (hereinafter, a "main substrate program") from the flash disk 107, and starts an activation process (1) of the main substrate 100. In the activation process (1), the CPU 101 performs an initialization process on the memory 202 of the sub substrate 200 in order to write data in the memory 202 of the sub substrate 200. The printer device 70 also calls the activation program of the printer device 70, and starts the activation process of the printer device 70.

At t1, the CPU 101 of the main substrate 100 calls a program necessary for causing the sub substrate 200 to perform the activation process (hereinafter, referred to as a "sub substrate program") from the flash disk 107. Then, the main substrate 100 transfers the called sub substrate program to the memory 202 of the sub substrate 200. The CPU 101 can write the sub substrate program in the memory 202 of the sub substrate 200, for example, using a Direct Memory Access (hereinafter, referred to as "DMA") technique.

At t3, the main substrate 100 performs reset release on the CPU 201 of the sub substrate 200. Through the reset release, the CPU 201 executes the sub substrate program developed onto the memory 202, and starts the activation process of the sub substrate 200. Meanwhile, the main substrate 100 performs an activation process (2) of the main substrate as the main substrate program is executed. Specifically, the CPU 101 of the main substrate 100 performs, for example, a process for establishing a path for inter-CPU communication with the CPU 201 of the sub substrate 200.

At t4, an inter-CPU communication path is established between the CPU 201 of the sub substrate 200 and a CPU 71 of the printer device 70.

At t5, an inter-CPU communication path is established between the CPU 101 of the main substrate 100 and the CPU 201 of the sub substrate 200. At this time, the main substrate 100 transmits device information necessary for the operation of the printer device 70 to the sub substrate 200.

At t6, the sub substrate 200 further transmits the device information received at t5 to the printer device 70. At this time, the device information may temporarily be stored in the memory 202 of the sub substrate or may be transferred to the printer device 70 through the sub substrate 200. Then, the CPU 71 of the printer device 70 starts the activation process of the printer device 70 based on the received device information. As an example, the printer device 70 receives a parameter necessary for processing the digital image data from the sub substrate 200, and performs a setting according to the parameter at the time of the activation process.

At t7, all of the main substrate 100, the sub substrate 200, and the printer device 70 are completely activated, and the image forming apparatus 1 enters the job executable state. At this time, the CPU 101 of the main substrate 100 causes the operation unit 30 to display a GUI operation screen so that a job input from the user is urged.

As described above, in the activation of the image forming apparatus according to the related art, the printer device 70 establishes the inter-CPU communication path between the main substrate 100 and the sub substrate 200 and then acquires the device information. Thus, an unnecessary standby time (for example, t4 to t6) occurs until the printer device 70 receives the device information, and thus there is a problem in that the activation of the entire image forming apparatus is delayed.

Figure 4:
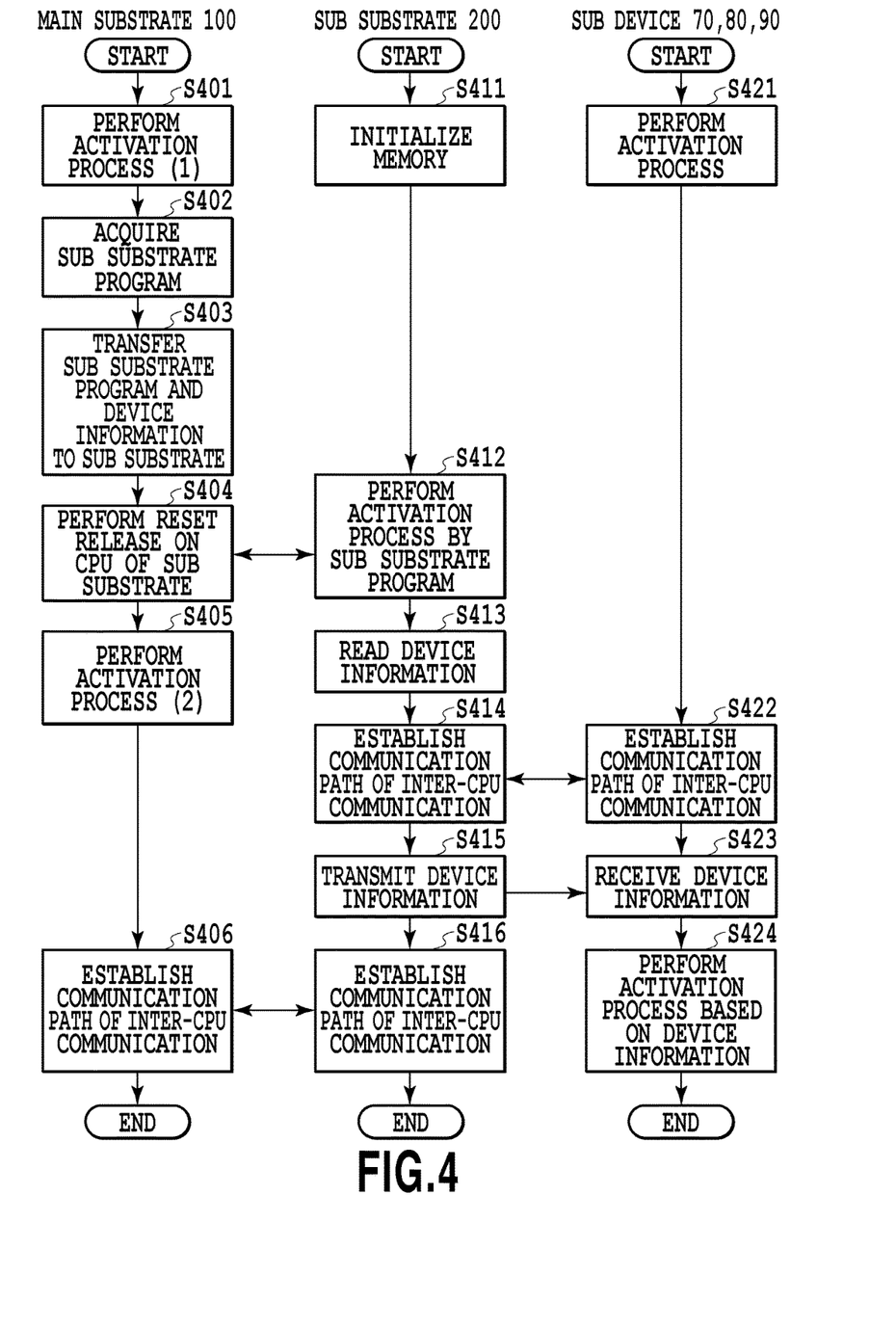
FIG. 4 is a flowchart illustrating an activation process of an image forming apparatus according to an embodiment.

FIG. 4 is a flowchart illustrating an activation process of the image forming apparatus 1 according to the present embodiment. Next, processes of the main substrate 100, the sub substrate 200, and the sub device will be described with reference to the flowchart of FIG. 4.

First, the process of the main substrate 100 will be described. A process of S401 to S406 illustrated in the flowchart is performed such that a program code of the main substrate 100 is developed onto the memory 102 and then executed by the CPU 101.

In S401, the CPU 101 calls the main substrate program from the flash disk 107, and starts an activation process (1) of the main substrate 100.

In S402, the CPU 101 acquires the sub substrate program necessary for the activation process of the sub substrate 200 from the flash disk 107.

In S403, the CPU 101 acquires the device information of the printer device 70 from the flash disk 107. Then, the CPU 101 transfers the acquired sub substrate program and the device information to the memory 202 of the sub substrate 200. In the present embodiment, the CPU 101 can write the sub substrate program and the device information in the memory 202 of the sub substrate 200 using the DMA technique.

In S404, the CPU 101 performs the reset release on the CPU 201 of the sub substrate 200.

In S405, the CPU 101 performs the activation process (2) of the main substrate 100 under control of the main substrate program. At this time, the CPU 101 mainly performs, for example, a process for establishing the inter-CPU communication path between the CPU 101 of the main substrate 100 and the CPU 201 of the sub substrate 200.

In S406, the inter-CPU communication path is established between the CPU 101 of the main substrate 100 and the CPU 201 of the sub substrate 200. In a case where the inter-CPU communication path is established between the CPU 101 and the CPU 201, the CPU 101 and the CPU 201 can perform transmission and reception of various information necessary for processing a job.

Next, the processing details of the sub substrate 200 will be described. A process of S411 to S416 illustrated in the flowchart is performed such that a program code written in the memory 202 of the sub substrate 200 or the like is developed and then executed by the CPU 201.

In S411, the CPU 101 initializes the memory 202.

In S412, as the reset release is performed by the CPU 101, the CPU 201 of the sub substrate 200 executes the sub substrate program developed onto the memory 202, and starts the activation process of the sub substrate 200. At this time, the CPU 201 performs the process of establishing the inter-CPU communication path between the CPU 201 of the sub substrate 200 and the CPU 71 of the printer device 70, the process of establishing the inter-CPU communication path between the CPU 201 and the CPU 101 of the main substrate 100, and the like. In further detail, the CPU 201 initializes the device controllers 209 and 210 in order to establish the inter-CPU communication path between the sub substrate 200 and the CPU 71 of the printer device 70. Further, the CPU 201 performs a register setting process for the image processing processor 208.

In S413, the CPU 201 reads the device information written in the memory 202 in S403.

In S414, the inter-CPU communication path between the CPU 201 of the sub substrate 200 and the CPU 71 of the printer device 70 is established. In a case where the inter-CPU communication path between the CPU 201 and the CPU 71 is established, the CPU 201 and the CPU 71 can perform transmission and reception of various information necessary for processing a job.

In S415, at a point in time at which the inter-CPU communication path between the CPU 201 and the CPU 71 is established, the CPU 201 transmits the device information necessary for the operation of the printer device 70.

In S416, the inter-CPU communication path is established between the CPU 101 of the main substrate 100 and the CPU 201 of the sub substrate 200. In a case where the inter-CPU communication path between the CPU 101 and the CPU 201 is established, the CPU 101 and the CPU 201 can perform transmission and reception of various information necessary for processing a job.

Lastly, the processing details of the printer device 70 will be described. In S421, the CPU 71 of the printer device 70 performs the activation process of the printer device 70.

In S422, the inter-CPU communication path between the CPU 201 of the sub substrate 200 and the CPU 71 of the printer device 70 is established. In a case where the inter-CPU communication path between the CPU 201 and the CPU 71 is established, the CPU 201 and the CPU 71 can perform transmission and reception of various information necessary for processing a job.

In S423, at a point in time at which the inter-CPU communication path between the CPU 201 and the CPU 71 is established, the printer device 70 receives the device information necessary for the operation of the printer device 70.

In S424, the CPU 71 of the printer device 70 performs the activation process of the printer device 70 based on the device information received in S423. For example, the CPU 71 of the printer device 70 receives the parameter necessary for processing the digital image data from the sub substrate 200, and performs a setting according to the parameter at the time of the activation process. The device information may be setting information according to a model type of the sub device. The CPU 71 of the printer device 70 can perform the activation process with reference to the setting information according to the transmitted model type of the printer device 70.

As described in the process according to the flowchart of FIG. 4, the printer device 70 can acquire the device information of the printer device 70 (S423) without waiting for the establishment of the inter-CPU communication path between the CPU 101 and the CPU 201 (S406 and S416).

Figure 5:
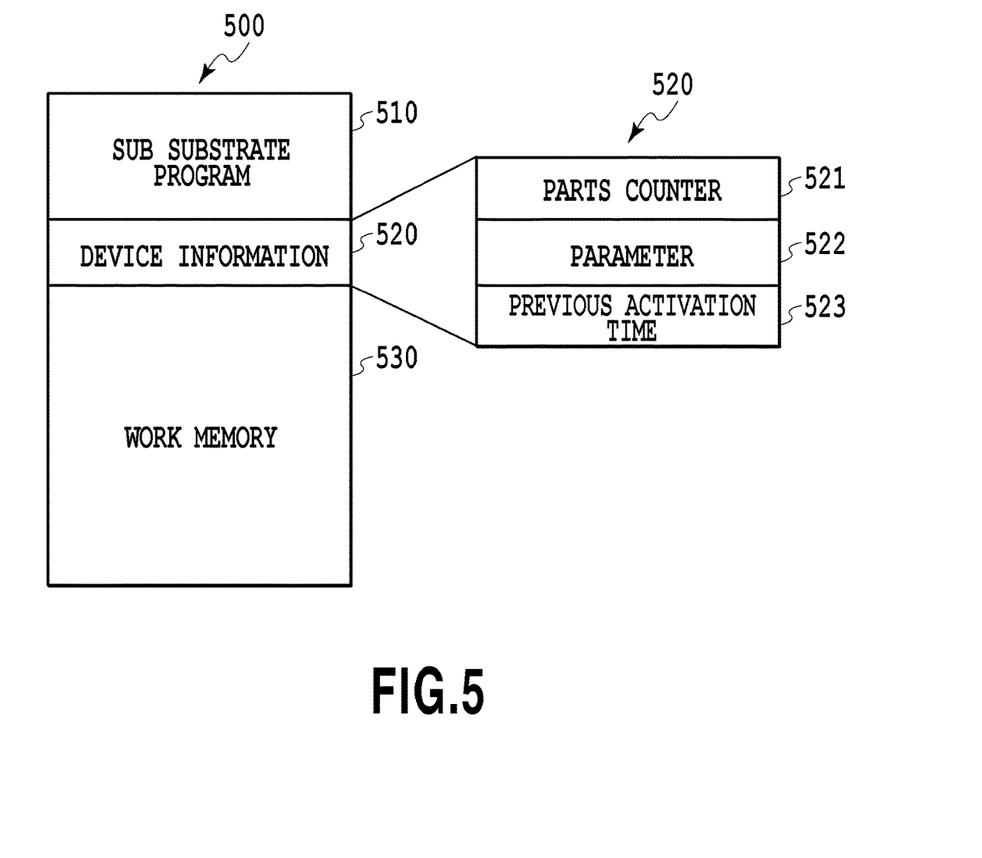
FIG. 5 is a diagram illustrating an example of a memory map of a memory mounted on a sub substrate according to an embodiment.

FIG. 5 is a diagram illustrating an example of a memory map of the memory 202 according to the present embodiment. In the present embodiment, a memory map 500 of the memory 202 includes a sub substrate program storage region 510, a device information storage region 520, and a work memory region 530.

The sub substrate program storage region 510 is a storage region of the sub substrate program executed by the CPU 201 of the sub substrate 200. The device information storage region 520 is a storage region of the device information necessary for the operation of the sub device. The work memory region 530 is a work memory area in which the CPU 201 of the sub substrate 200 processes the sub substrate program.

The device information storage region 520 according to the present embodiment further includes a part counter information storage region 521, a parameter storage region 522, and a previous activation time storage region 523.

The part counter information storage region 521 is a region storing the number of operations of the sub device. In the present embodiment, for example, part counter information is the number of operations of a drum or a fixing device of the printer device 70. The parameter storage region 522 is a region storing a parameter used in a case where the CPU 201 executes the sub substrate program. In the present embodiment, for example, the parameter is an image parameter necessary in a case where the printer device 70 performs image processing on the digital image data. The previous activation time storage region 523 is a region storing a previous activation time of the image forming apparatus 1. In the printer device 70 of the present embodiment, an adjustment operation necessary for the activation process differs according to an activation time interval of the printer device 70. Thus, the CPU 71 of the printer device 70 switches the adjustment operation necessary for the activation process according to the activation time interval of the printer device 70 with reference to the previous activation time stored in the previous activation time storage region 523. In the present embodiment, in a case where a period of time from the previous activation of the image forming apparatus 1 to the current activation thereof is long, the printer device 70 performs a large number of adjustment operations in the activation process (S424) based on the device information. On the other hand, in a case where the period of time from the previous activation of the image forming apparatus 1 to the current activation thereof is short, the printer device 70 performs a small number of adjustment operations in the activation process (S424) based on the device information.

Figure 6:
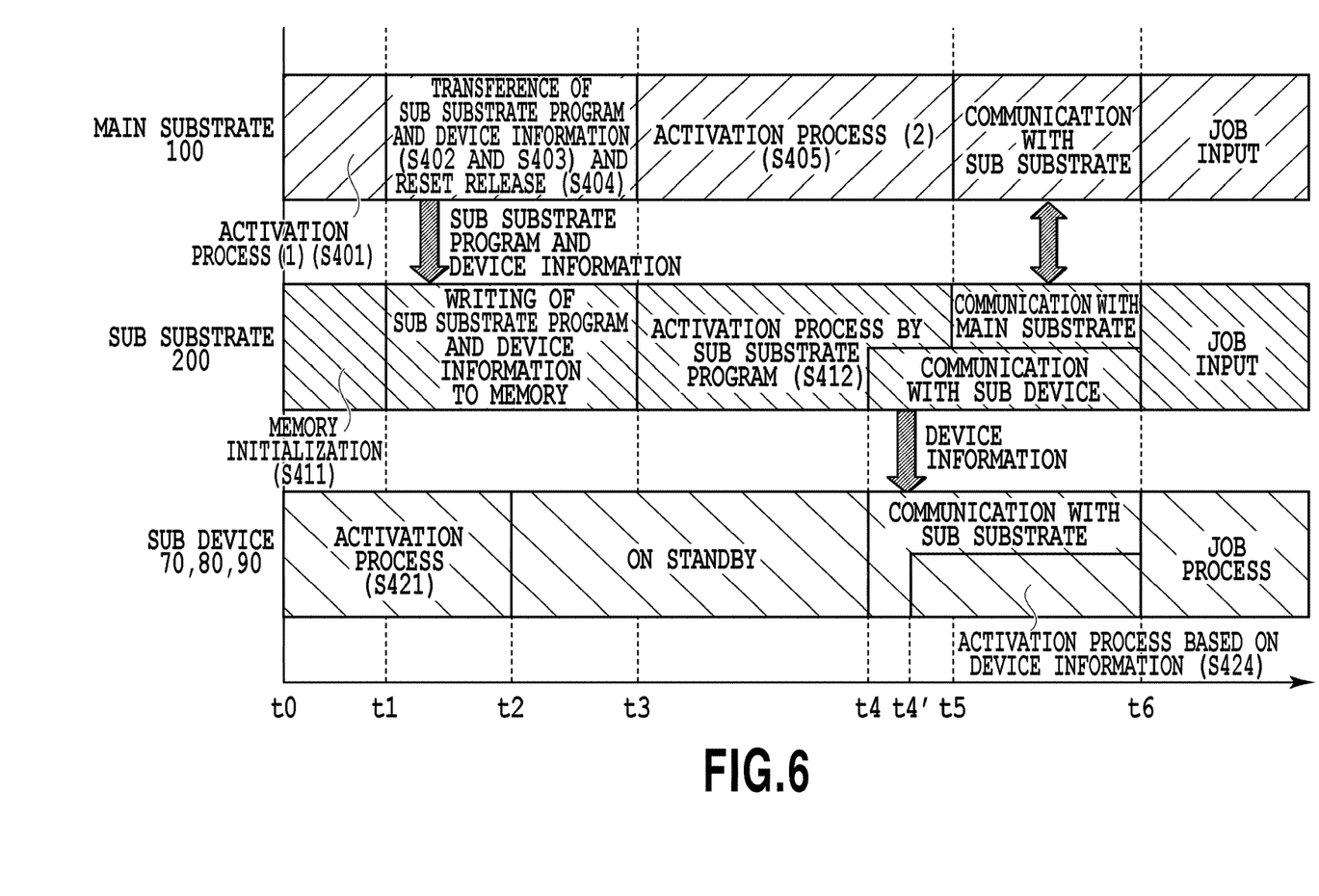
FIG. 6 is a time chart illustrating an activation sequence of an image forming apparatus according to an embodiment.

FIG. 6 is a time chart illustrating an activation sequence of the image forming apparatus 1 according to the present embodiment. The activation sequence of the image forming apparatus 1 according to the present embodiment will be described with reference to the time chart illustrated in FIG. 6.

At t0, each of the main substrate 100, the sub substrate 200, and the sub devices 70, 80, and 90 starts the activation process. The main substrate 100 calls the main substrate program from the flash disk 107, and starts the activation process (1) of the main substrate 100 (S401). The printer device 70 also calls the activation program of the printer device 70, and starts the activation process of the printer device 70 (S421). In the activation process (1), the CPU 101 performs the initialization process for the memory 202 of the sub substrate 200 in order write data in the memory 202 of the sub substrate 200. The printer device 70 also calls the main substrate program of the printer device 70, and starts the activation process of the printer device 70.

At t1, the CPU 101 of the main substrate 100 acquires the sub substrate program necessary in a case where the sub substrate 200 performs the activation process from the flash disk 107 (S402). At this timing, the CPU 101 of the main substrate 100 acquires the device information of the printer device 70 from the flash disk 107 (S403). Then, the CPU 101 transfers the acquired sub substrate program and the device information to the memory 202 of the sub substrate 200. In the present embodiment, the CPU 101 can write the sub substrate program in the memory 202 of the sub substrate 200 using the DMA technique. Further, the main substrate 100 may transfer the device information at the same time as the sub substrate program or may transfer the sub substrate program and the device information in order as long as the device information can be transferred to the sub substrate 200 before the CPU 201 of the sub substrate 200 starts the activation process. As a modified example, the CPU 101 of the main substrate 100 may transfer the device information to the memory 202 of the sub substrate 200 before the inter-CPU communication path is established between the CPU 101 and the CPU 201 of the sub substrate 200.

At t3, the main substrate 100 performs the reset release on the CPU 201 of the sub substrate 200 (S404). Through the reset release, the CPU 201 executes the sub substrate program developed onto the memory 202 and starts the activation process of the sub substrate 200. On the other hand, the main substrate 100 performs the activation process (2) of the main substrate as the main substrate program is executed. Specifically, the CPU 101 of the main substrate 100 performs, for example, the process for establishing the path for the inter-CPU communication with the CPU 201 of the sub substrate 200.

At t4, the inter-CPU communication path between the CPU 201 of the sub substrate 200 and the CPU 71 of the printer device 70 is established (S414, S422). The sub substrate 200 transmits the device information necessary for the operation of the printer device 70 to the printer device 70 (S415, S423).

Generally, the CPU 71 of the printer device 70 calls a very simple program from the ROM of the printer device 70 and performs the activation process, and thus the activation of the printer device 70 is performed more promptly than the controller 10. Thus, a timing (t4) at which the inter-CPU communication path is established the CPU 201 and the CPU 71 of the printer device 70 is earlier than a timing (t5) at which the inter-CPU communication path is established between the CPU 101 of the main substrate 100 and the CPU 201 of the sub substrate 200. Thus, the CPU 201 of the sub substrate 200 can transmit the device information to the printer device 70 before the inter-CPU communication path between the CPU 101 and the CPU 201 is established.

At t4', the CPU 71 of the printer device 70 starts the activation process of the printer device 70 based on the device information received in t4 (S424). For example, the printer device 70 receives the parameter necessary for processing the digital image data from the sub substrate 200, and performs a setting according to the parameter at the time of the activation process.

The activation of the image forming apparatus 1 according to the present embodiment is more excellent than the image forming apparatus according to the related art illustrated in FIG. 3 in the following point. In other words, since the printer device 70 acquires the device information of the printer device 70, it is unnecessary to wait until the inter-CPU communication path is established between the CPU 101 of the main substrate 100 and the CPU 201 of the sub substrate 200. Thus, since it is possible to complete the activation process of the printer device 70 promptly, it is possible to activate the image forming apparatus 1 at a high speed.

At t5, the inter-CPU communication path is established between the CPU 101 of the main substrate 100 and the CPU 201 of the sub substrate 200 (S406 and S416).

At t6, the main substrate 100, the sub substrate 200, and the printer device 70 are completely activated, and the image forming apparatus 1 enters the job executable state. At this time, the CPU 101 of the main substrate 100 causes the operation unit 30 to display the GUI operation screen so that the job input from the user is urged.

As described above, in the activation of the image forming apparatus 1 according to the present embodiment, the main substrate 100 transfers the device information necessary for the operation of the printer device 70 to the sub substrate 200 before the sub substrate 200 starts the activation process. Thus, the printer device 70 can acquire the device information promptly without unnecessarily waiting until the inter-CPU communication path in the controller 10 is established. As a result, it is possible to activate the image forming apparatus 1 at a high speed.

Other Embodiments

The above embodiment has been described in connection with the example in which, in a case where the image forming apparatus 1 returns from the lower power consumption mode to the normal power consumption mode, the CPU 101 transfers the sub substrate program read from the flash disk 107 to the memory 202 of the sub substrate 200. The embodiment is not limited thereto, and the CPU 101 may read the sub substrate program and the device information from the memory 102 of the main substrate 100. In this case, in a case where the image forming apparatus 1 transitions from the normal power consumption mode to the lower power consumption mode, the sub substrate program and the device information are generated, and the generated sub substrate program and the device information are stored in the memory 102. Then, in a case where the image forming apparatus 1 returns from the lower power consumption mode, the CPU 101 of the main substrate 100 transfers the sub substrate program and the device information stored in the memory 102 to the memory 202 of the sub substrate 200.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image forming apparatus, the control method of the image forming apparatus, and the program of the present invention, it is possible to provide the image forming apparatus that is activated at a high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-035863, filed Feb. 25, 2015 which is hereby incorporated by reference wherein in its entirety.

What is claimed is:

1. An image forming apparatus, comprising:
a main system;
a sub system that communicates with the main system; and
a device that communicates with the sub system, wherein:
the main system includes a transfer unit configured to transfer, to a memory of the sub system, a boot program of the sub system and device information that is necessary for the device to perform an activation process of the device,
the sub system includes;
a control unit configured to perform, based on the boot program that has been transferred by the transfer unit and is in the memory of the sub system, an establishment process for establishing communication between the main system and the control unit, and
a transmission unit configured to transmit, to the device, the device information that has been transferred by the transfer unit and is in the memory of the sub system, and
the device includes an execution unit configured to execute the activation process of the device using the device information transmitted by the transmission unit,
wherein the transfer unit included in the main system is configured to transfer, to the memory of the sub system, the boot program of the sub system and the device information that is necessary for the device to perform the activation process of the device, before the establishment process establishes the communication between the main system and the control unit included in the sub system.

2. The image forming apparatus according to claim 1, wherein the transfer unit memory-transfers the device information to the memory of the sub system by a direct memory access without intervention of a CPU of the main system.

3. The image forming apparatus according to claim 1, wherein the transfer unit memory-transfers the device information to the memory of the sub system before the activation process of the sub system is started by the control unit.

4. The image forming apparatus according to claim 1, wherein the transfer unit memory-transfers the boot program and the device information to the memory of the sub system at the same time.

5. The image forming apparatus according to claim 1, wherein the main system further includes a reset release unit configured to perform reset release on a CPU of the sub system, and
the control unit performs the activation process of the sub system in response to which the reset release is performed, and
the transfer unit included in the main system transfers the device information to the memory of the sub system before the reset release unit performs reset release on the CPU of the sub system.

6. The image forming apparatus according to claim 1, wherein the device information is a parameter necessary for the device to process digital image data.

7. The image forming apparatus according to claim 1, wherein the device information is setting information according to a model type of the device.

8. The image forming apparatus according to claim 1, wherein the device information is a previous activation time of the image forming apparatus.

9. The image forming apparatus according to claim 1, wherein the device is a printer device.

10. A control method of an image forming apparatus including a main system, a sub system that communicates with the main system and includes a control unit, and a device that communicates with the sub system, the control method comprising the steps of:
memory-transferring, from the main system to a memory of the sub system, a boot program of the sub system and device information that is necessary for the device to perform an activation process of the device;
controlling, based on the boot program that has been transferred by the memory-transferring to the memory of the sub system, an establishment process for establishing communication between the main system and the control unit;
transmitting, to the device, the device information that has been transferred by the memory-transferring and is in the memory of the sub system; and
executing the activation process of the device using the device information transmitted in the transmitting step,
wherein the memory-transferring to the memory of the sub system of the boot program of the sub system and the device information that is necessary to perform the activation process of the device is performed before the establishment process establishes the communication between the main system and the control unit included in the sub system.

11. The control method according to claim 10, wherein, in the memory-transferring step, the device information is memory-transferred to the memory of the sub system by a direct memory access without intervention of a CPU of the main system.

12. The control method according to claim 10, wherein, in the memory-transferring step, the device information is memory-transferred to the memory of the sub system before the activation process of the sub system is started in the controlling step.

13. The control method according to claim 10, wherein, in the memory-transferring step, the boot program and the device information are memory-transferred to the memory of the sub system at the same time.

14. The control method according to claim 10, further comprising,
reset releasing a CPU of the sub system from the main system,
wherein, in the controlling step, the activation process of the sub system is performed in response to which the reset release is performed, and
the memory-transferring transfers the device information to the memory of the sub system before the reset release of the CPU of the sub system is performed.

15. The control method according to claim 10,
wherein the device information is a parameter necessary for the device to process digital image data.

16. The control method according to claim 10,
wherein the device information is setting information according to a model type of the device.

17. The control method according to claim 10,
wherein the device information is a previous activation time of the image forming apparatus.

18. The control method according to claim 10,
wherein the device is a printer device.

19. The image forming apparatus according to claim 1, wherein the establishment process enables the main system and the control unit included in the sub system to send to and receive from each other information for job processing.

20. The image forming apparatus according to claim 1, wherein
the transfer unit can transfer, to the sub system, the boot program of the sub system and the device information, without intervention of the control unit included in the sub system, before the establishment process establishes the communication between the main system and the control unit included in the sub system.

21. The image forming apparatus according to claim 1, wherein
the transmission unit can transmit, to the sub device, the device information that has been transferred by the transfer unit and is in the memory of the sub system, before the communication between the control unit and the main system is established.

22. An image forming apparatus, comprising:
a first processor system including a processor;
a second processor system including a processor; and
a printer device that communicates with the second processor system,
wherein:
the first processor system transfers, to the second processor system, a boot program of the second processor system and device information that is necessary for the printer device to perform an activation process of the printer device, and establishes communication between the processor included in the first processor system and the processor included in the second processor system,
the second processor system transfers, to the printer device, the device information that has been transferred to the second processor system by the first processor system, based on the boot program that has been transferred to the second processor system by the first processor system, and
the printer device executes the activation process using the device information having been transferred by the second processor system,
wherein the first processor system transfers, to the second processor system, the device information before the communication between the processor included in the first processor system and the processor included in the second processor system is established.

23. The image forming apparatus according to claim 22, wherein
the second processor system transfers the device information that the first processor system has transferred to the second processor system to the printer device before the communication between the processor included in the first processor system and the processor included in the second processor system is established.

24. The image forming apparatus according to claim 22, wherein
the first processor system includes a network controller that receives data from an external device via a network, and the second processor system includes an image processor that performs an image process for printing.

25. The image forming apparatus according to claim 22, wherein
the first processor system starts the processor included in the second processor system after transferring, to the second processor system, the boot program of the second processor system and the device information, and
the processor included in the second processor system, that has been started by the first processor system, executes the boot program that has been transferred by the first processor system.

26. The image forming apparatus according to claim 25, wherein
the second processor system transfers the device information that the first processor system has transferred to the second processor system before the first processor system starts the processor included in the second processor system, to the printer device based on the boot program.

27. The image forming apparatus according to claim 22, wherein
the device information includes at least one of an image process parameter, type information of the printer device, and time information indicating a previous activation time of the image forming apparatus.

28. The image forming apparatus according to claim 22, wherein
the first processor system transfers the device information to the second processor system by DMA (Direct Memory Access).

29. The image forming apparatus according to claim 22, wherein
the first processor system transfers the device information to the second processor system, before the communication between the processor included in the first processor system and the processor included in the second processor system is established, without using the processor included in the second processor system.

30. The image forming apparatus according to claim 22, wherein the establishment of the communication between the processor included in the first processor system and the processor included in the second processor systems enables the processor included in the first processor system and the processor included in the second processor system to send to and receive from each other information for job processing.

* * * * *